Patented Aug. 17, 1926.

1,596,591

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing.   Application filed May 29, 1925. Serial No. 33,832.

This invention relates to the treatment of emulsions of mineral oil and water, such as cut oil, roily oil, bottom settlings and other petroleum emulsions, for the purpose of separating the oil from the water.

Petroleum emulsions of the kind referred to are of the water-in-oil type and consist of droplets of water encased in emulsifying films and dispersed in a body of oil that constitutes the continuous phase of the emulsion, the emulsifying films which surround the droplets of water being of an oily nature, and hence tending to prevent the water droplets from coalescing.

An emulsion of the character referred to can be broken in various ways so as to cause or permit the water to separate from the oil, one process that is now used extensively consisting in first subjecting the emulsion to the action of a chemical treating agent or demulsifying agent and thereafter allowing the emulsion to remain in a quiescent state, at a suitable temperature, after treatment, so as to permit the water of the emulsion to separate from the oil of the emulsion by gravity. The various stages through which the emulsion passes while it is "breaking", irrespective of the particular means or process employed to break the emulsion, are substantially as follows, i. e.:

A first stage in which the oily emulsifying films that surround the droplets of water tend to prevent the small droplets from combining with the larger droplets;

A second stage in which the water in the emulsifying films finds its way into fissures in said films, and thus virtually changes the emulsifying films from oily surfaces into watery or moist surfaces;

A third stage in which the small water droplets touch larger droplets and coalesce with same, due to the action of surface tension, thereby producing larger droplets, which, however, are not of sufficient size to be drawn down by gravity through the mass of emulsion; and A fourth stage in which the larger droplets coalesce in the manner above described with other large droplets, thereby producing droplets which are of such size that gravity will cause them to be carried downwardly to the bottom of the mass.

I have discovered that in the second stage above described, that I will refer to as the "incipient break" stage and which corresponds to what is generally termed the "breaking point" of the emulsion, the water droplets whose films have been changed from their original anhydrous state into a moist state are capable of functioning in a similar manner to a capillary substance, if said moist films are brought into contact with water droplets whose films have not been moistened by the water in the films finding its way into the fissures of the films. Accordingly, I propose to use a petroleum emulsion that has started to break to effect the breaking of an additional supply of emulsion whose water droplets are encased in films that are substantially anhydrous, thereby producing a process that is more efficient than the processes now used, in that no additional expense is involved in the treatment of the fresh emulsion that is added to the emulsion which has started to break.

In making practical use of my discovery, I first subject a quantity of petroleum emulsion to any treatment that will cause the emulsion to start to break, and during this intermediate stage which corresponds to the first stage previously mentioned I prevent the emulsion that is undergoing treatment from being diluted by fresh emulsion. Thereafter when the "incipient break" occurs, I add a quantity of fresh emulsion or untreated emulsion to the emulsion that has passed through the intermediate stage without dilution, thereby causing the dry or substantially anhydrous emulsifying films of the untreated emulsion to come into contact with the water coated films of the treated emulsion, whereupon the water droplets encased in said dry films will be drawn by capillary attraction to the water droplets whose films are moist, with the result that the droplets encased in the moist films will increase in size and the droplets encased in the anhydrous films will diminish in size.

In the treatment of oil field emulsions with chemical treating agents or demulsifying agents there is always a definite ratio which is the maximum at which the treating agent will act under conditions of industrial employment. Usually this ratio varies between 1 part of treating agent to 3,000 parts of emulsion to 1 part of treating agent to 12,000 parts of emulsion, but during the entire operation of treating the emulsion this ratio is kept substantially constant. Consequently, when my discovery is used in connection with a process that contemplates treating a water-in-oil emulsion with a chemical treating agent, said treating agent is added to the emulsion at a certain ratio, and when the "incipient break" occurs, a quantity of fresh emulsion or untreated emulsion is added to the treated emulsion. The "incipient break" stage or the point at which the fresh emulsion is added can be easily determined by the change in color of the emulsion, from a yellow or brown to a greenish black. The "incipient break" stage can also be easily determined by a centrifugal test which will show a great decrease in the emulsion content. In this stage the water droplets present in the emulsion have a large number of fissures with water at their surfaces, and accordingly, I have herein referred to said films as "moist" films in contradistinction to the films of untreated emulsion which are anhydrous or substantially "dry" to water.

My discovery can be made use of in any process for breaking a water-in-oil emulsion in which a chemical or other means is used to effect a change in the condition of the emulsion so as to produce the "incipient break" previously referred to. The amount of fresh or untreated emulsion that can be added to the treated emulsion varies according to the nature of the emulsion, but may be from 10% to even 100% of the semi-broken emulsion. I have made practical use of my discovery in the treatment of petroleum emulsions obtained from the Goose Creek field of Texas, which emulsions can be treated directly by means of a modified fatty acid, as described in United States Patent No. 1,467,831, to William S. Barnickel, dated September 11, 1923, at a ratio of 1 to 5,000. In treating such emulsions the treating agent is added to the emulsion at the rate of 1 barrel of treating agent to 5,000 barrels of emulsion, and when the color of the emulsion changes from a light yellow to a dark green, thus indicating that the emulsifying films which encase the droplets of water have become wet, a quantity of fresh emulsion, say, for example, 50% of the original quantity of emulsion, is added to the treated emulsion, with the result that the water droplets of the fresh emulsion will coalesce with the water droplets of the treated emulsion when the substantially dry emulsifying films of the fresh emulsion contact with the moist films of the treated emulsion.

Having thus described my invention, what I claim as new and desire to secure by Letters Patent is:

1. In a process for breaking water-in-oil emulsions, bringing the emulsion to an incipient break without dilution, and then adding fresh or untreated emulsion to same.

2. A process for breaking petroleum emulsions, characterized by subjecting the emulsion to the action of a demulsifying agent and bringing the emulsion to an incipient break without dilution, and thereafter adding fresh or untreated emulsion to the treated emulsion after it has reached the incipient break.

MELVIN DE GROOTE.